United States Patent [19]

Gaiser

[11] Patent Number: 4,475,338

[45] Date of Patent: Oct. 9, 1984

[54] MASTER CYLINDER

[75] Inventor: Robert F. Gaiser, Stevensville, Mich.

[73] Assignee: The Bendix Corporation, Southfield, Mich.

[21] Appl. No.: 353,319

[22] Filed: Mar. 1, 1982

[51] Int. Cl.³ .............................................. B60T 11/20
[52] U.S. Cl. ....................................... 60/562; 60/589; 60/581
[58] Field of Search .................. 60/562, 588, 589, 581

[56] References Cited

U.S. PATENT DOCUMENTS

| 3,060,691 | 10/1962 | Davis | 60/562 |
|---|---|---|---|
| 3,162,018 | 12/1964 | Daley | 60/581 |
| 3,800,539 | 4/1974 | LeMarchand | 60/562 |
| 4,152,897 | 5/1979 | Falk | 60/589 |
| 4,249,381 | 2/1981 | Gaiser | 60/562 |

FOREIGN PATENT DOCUMENTS 69662 11/1958 France ................... 60/562

Primary Examiner—Abraham Hershkovitz
Assistant Examiner—Scott L. Moritz
Attorney, Agent, or Firm—Paul David Schoenle; Ken C. Decker

[57] ABSTRACT

A master cylinder includes a housing (18) with a pair of pistons (60, 64) operable to pressurize a pair of pressure chambers (66, 72). One (64) of the pair of pistons includes means (76, 80) to control communication from a reservoir (34) to both pair of pressure chambers (66, 72).

1 Claim, 2 Drawing Figures

MASTER CYLINDER

This invention relates to a master cylinder wherein a pair of pistons cooperate with a housing to form a pair of pressure chambers and the pair of pistons are movable during braking to generate fluid pressure within the pair of pressure chambers. Each of the pair of pressure chambers communicates with a separate brake circuit to communicate fluid pressure thereto.

A master cylinder comprises a housing (18) with an open end (20) leading to a bore (24) within the housing, a pair of pistons (60, 64) disposed within the bore (22), the pair of pistons (60, 64) being movable during braking to generate fluid pressure within a pair of pressure chambers (72, 66) disposed within the housing bore, and the housing (18) defining a pair of compensation ports (56, 58) for communicating fluid to the pair of pressure chambers (72, 66) when braking is terminated.

In U.S. Pat. No. 4,249,381, a displacement type master cylinder is disclosed. A pair of seals are fixedly disposed within a housing bore and a pair of pistons are sealingly engageable with the pair of seals, respectively. The housing defines a pair of reservoir cavities which communicate fluid to the pair of pressure chambers via compensation ports. In order to control fluid communication from the reservoir cavities to the pressure chambers, each piston is provided with notches opening communication between the cavities and the pressure chamber when the pistons are in a rest position. Consequently, each piston must be fabricated with notches so that both pistons are subjected to a fabrication operation.

The master cylinder of the invention is characterized by one (64) of said pair of pistons including means (80, 76) to close communication between the pair of compensation ports (56, 58) and the pair of pressure chambers (72, 66).

One advantage resulting from the invention is that the structure for the piston without notches is simplified and the piston with notches can be fabricated in a single operation to provide both compensation paths for each pressure chamber.

A further advantage resulting from the invention is that the pair of pistons can be fully telescoping to provide a shorter length for the master cylinder.

The invention will now be described with reference to the accompanying drawings in which.

Figure 1:
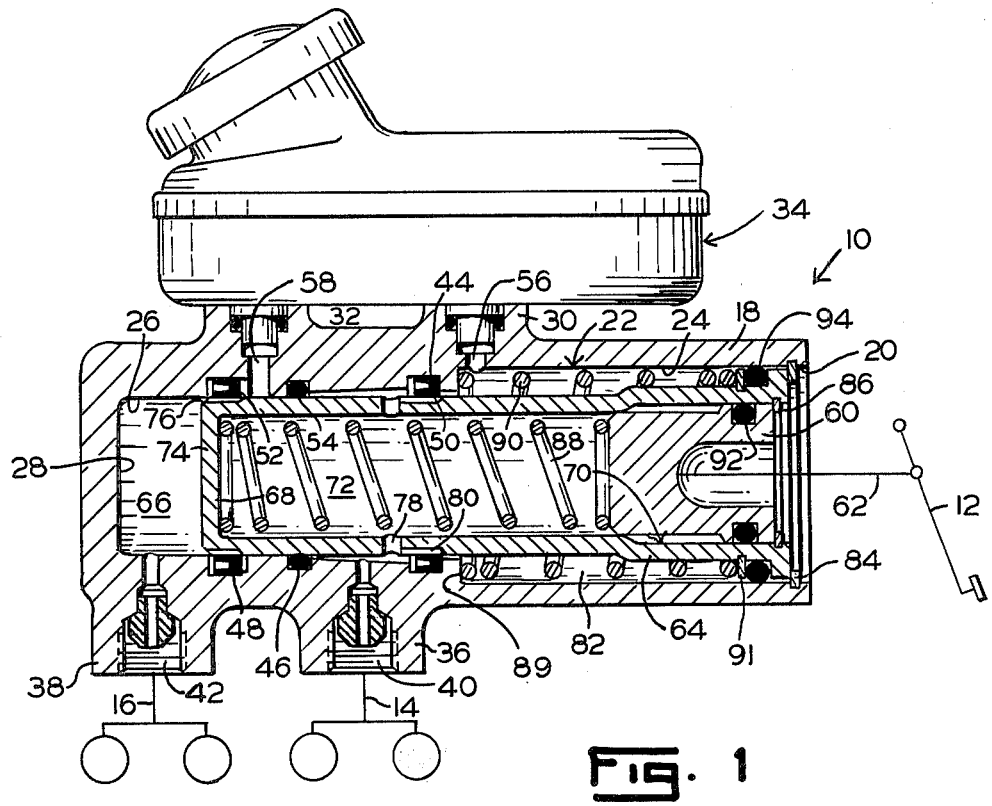
FIG. 1 shows a master cylinder of the present invention in a brake system.

A master cylinder 10 is disposed within a brake system including a brake pedal 12 and a pair of brake circuits 14 and 16. The brake circuits may be axle to axle, as shown, or cross-split depending on the vehicle receiving the master cylinder 10. The operation of the master cylinder 10 is substantially conventional such that pivotal movement of the pedal 12 in a clockwise direction during braking results in fluid pressure being generated in the master cylinder 10 and also in the brake circuits 14 and 16.

The master cylinder 10 includes a housing 18 with an open end 20 leading to a bore 22. The bore 22 is stepped with a large diameter portion 24 adjacent the open end 20 and a small diameter portion 26 extending from an end wall 28. A first pair of bosses 30 and 32 extend upwardly from the housing 18 to support a reservoir 34 and a second pair of bosses 36 and 38 define outlet ports 40 and 42, respectively, communicating with the brake circuits 14 and 16.

The bore 26 is provided with a plurality of recesses 44, 46 and 48. Recesses 44 and 48 receive U cup seals 50 and 52 while the recess 46 receives an O ring seal 54. A first compensation port 56 communicates the reservoir 34 with the bore 24 to the right of U cup seal 50 and a second compensation port 58 communicates the reservoir 34 with the bore 26 between O ring seal 54 and U cup seal 52.

A primary piston 60 cooperates with an input member illustrated schematically at 62 to move within the bore 24 in response to movement of the pedal 12. A secondary piston 64 is movably disposed within the bore 24. The secondary piston 64 sealingly engages the U cup seal 52 and cooperates with the end wall 28 to substantially define a secondary pressure chamber 66. The secondary piston also sealingly engages the U cup seal 50. The secondary piston 64 is substantially U shaped in cross section to form a cavity 68 and the primary piston 60 is disposed within the cavity to sealingly engage a wall 70 of the cavity to substantially define a primary pressure chamber 72. In order to communicate the compensation port 58 with the pressure chamber 66, the forward end 74 of the secondary piston 64 is provided with one or more notches 76 which partially overlap or fluidly communicate with the compensation port 58 when the secondary piston is disposed in its rest position. the secondary piston 64 is also provided with one or more apertures 78 leading to the primary pressure chamber 72 and one or more notches 80 adjoining the apertures 78 and overlapping or fluidly communicating with the compensation port 56 to communicate the latter with the primary pressure chamber 72 via a radial clearance 82 between the large diameter portion 24 and the secondary piston 64 and a small clearance between the small diameter portion 26 and the secondary piston 64 immediately to the right of U cup seal 50.

The open end 20 of the bore 24 carries a snap ring or stop 84 and the secondary piston 64 extends axially from the U cup seal 52 to abut the stop 84 in the rest position when braking is terminated. In order to define a rest position for the primary piston 60, the wall 70 of the secondary piston 64 is provided with a snap ring or stop 86 opposite the forward end 74. The primary piston 60 is biased into abutment with the stop 86 on the secondary piston 64 by means of a spring 88 disposed within the cavity 68 and the secondary piston 64 is biased into engagement with the stop 84 by means of a spring 90 disposed within the radial clearance 82. The spring abuts a housing shoulder 89 and a washer 91 secured to the secondary piston 64. The spring 88 includes a greater spring force when installed than spring 90.

As shown in the drawing, the primary piston 60 remains in spaced relation to the housing 18 and is also entirely disposed within the secondary piston cavity 68 in a fully telescoping manner. The spring 90 is closer to the open end 20 than the spring 88 is to the open end 20. The primary piston carries a seal 92 slidably engaging the wall 70 of cavity 68 and the secondary piston 64 carries a seal 94 slidably engaging the large diameter portion 24.

During a brake application, the pedal 12 is actuated to impart movement to the input member 62 and the primary piston 60. The primary piston 60 moves to the left simultaneously with the secondary piston 64 to close off both compensation ports 56 and 58 and the volume of primary pressure chamber 72. Initially, the spring 90 is contracted to generate fluid pressure in chamber 66. Thereafter, the spring 88 is contracted to permit relative movement between the pistons to generate fluid pressure within the chamber 72. The notches 76 and 80 are simultaneously moved past the U cup seals 52 and 50, respectively, and out of communication with the compensation ports 58 and 56, respectively. Fluid pressure generated in the primary pressure chamber 72 is communicated through the apertures 78 to a small radial clearance between the small diameter portion 26 and the secondary piston 64 axially between the O ring seal 54 and the U cup seal 50. From the small radial clearance the fluid pressure is communicated to the outlet port 40 and to the brake circuit 14. Fluid pressure generated in the secondary pressure chamber 66 is communicated directly to the outlet port 42 and to the brake circuit 16. Upon termination of braking, the springs 88 and 90 bias the pair of pistons to return to their rest position abutting stops 84 and 86, thereby reestablishing communication between the pair of pressure chambers and the reservoir. If a delayed pressurization is desired for the pair of pressure chambers, it is possible to change the axial position of the notches 76 and 80 on the secondary piston to accommodate the delayed pressurization for chambers 66 and 72.

Figure 2:
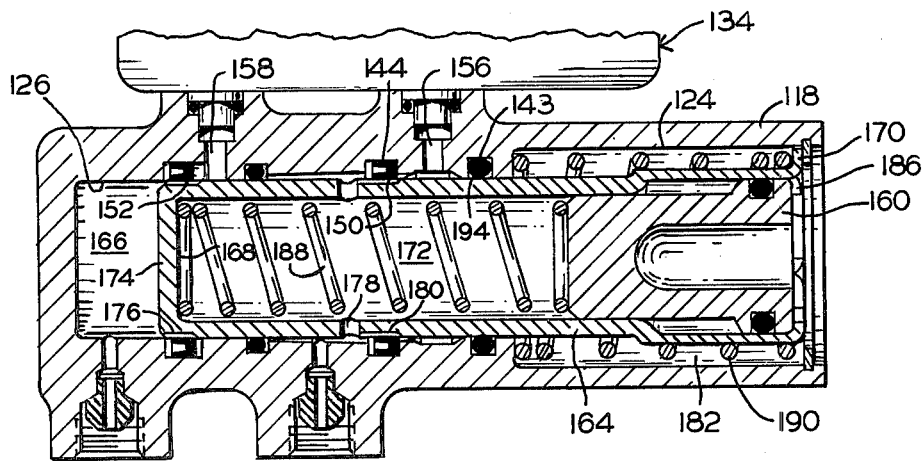
FIG. 2 shows an alternative embodiment for the master cylinder of FIG. 1.

In the alternative embodiment of FIG. 2 similar elements are numbered the same in FIG. 1 plus one hundred. The small diameter portion 126 is provided with an additional recess 143 for an O ring seal 194 which takes the place of O ring seal 94 in FIG. 1. Therefore, the radial clearance 182 which receives spring 190 is open to atmosphere. Also, the end of the secondary piston 164 is stamped to form a spring seat 170 and a stop 186 which abuts the primary piston 160. Both embodiments show a separate plastic reservoir; however, it is feasible to provide an integral reservoir contiguous with the housings 18 and 118.

Although the foregoing description proceeds with reference to a displacement type master cylinder, it is feasible by one skilled in the art to utilize a single piston for simultaneous compensation control in a conventional type master cylinder if the secondary piston is modified to carry a pair of U cup seals therewith. Further modifications are also feasible by one skilled in the art and, as such, all of these modifications are included within the scope of the appended claims.

I claim:

1. A master cylinder for a brake system comprising a housing with a pair of pistons cooperating with the housing to substantially define a pair of pressure chambers communicating, respectively, with a pair of brake circuits, the housing defining a bore to movably receive the pair of pistons, a pair of seals fixedly disposed within the housing bore and cooperating with one of the pair of pistons to define fluid passages between a reservoir and the pair of pressure chambers, respectively, the one piston being movable during braking to simultaneously close both fluid passages so that fluid pressure is generated in the pair of pressure chambers, the housing bore defining a shoulder separating a small diameter portion from a large diameter portion, the pair of seals being fixedly disposed within the small diameter portion, the one piston defining a radial clearance with the large diameter portion, a first spring extending between the pair of pistons to bias the other piston to a rest position within the housing bore, and a second spring extending between the shoulder and the one piston to bias the latter to a rest position within the housing bore.

* * * * *